US012658747B2

(12) United States Patent
Kawate et al.

(10) Patent No.: US 12,658,747 B2
(45) Date of Patent: Jun. 16, 2026

(54) ROTOR AND ROTATING ELECTRIC MACHINE

(71) Applicant: DENSO CORPORATION, Kariya-city (JP)

(72) Inventors: Fumiya Kawate, Kariya-city (JP); Ritsuro Hiramatsu, Kariya-city (JP); Toshihiro Uchida, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 233 days.

(21) Appl. No.: 18/507,396

(22) Filed: Nov. 13, 2023

(65) Prior Publication Data

US 2024/0079919 A1     Mar. 7, 2024

Related U.S. Application Data

(63) Continuation of application No. PCT/JP2022/020135, filed on May 13, 2022.

(30) Foreign Application Priority Data

May 13, 2021    (JP) ................................. 2021-081640

(51) Int. Cl.
    *H02K 1/27*          (2022.01)
    *H02K 1/276*         (2022.01)
(52) U.S. Cl.
    CPC ......... *H02K 1/276* (2013.01); *H02K 2201/06* (2013.01); *H02K 2213/03* (2013.01)
(58) Field of Classification Search
    CPC ............... H02K 1/276; H02K 2201/06; H02K 2213/03; H02K 1/2773; H02K 29/03
    See application file for complete search history.

(56) References Cited

U.S. PATENT DOCUMENTS

| | | | |
|---|---|---|---|
| 2005/0012419 A1 | 1/2005 | Kometani et al. | |
| 2013/0313936 A1* | 11/2013 | Shibata | ................ H02K 1/2746 310/156.43 |
| 2016/0020653 A1* | 1/2016 | Ueda | ...................... H02K 1/278 310/43 |

(Continued)

FOREIGN PATENT DOCUMENTS

| | | |
|---|---|---|
| JP | 2000-197292 A | 7/2000 |
| JP | 2015-142386 A | 8/2015 |

(Continued)

*Primary Examiner* — Thomas Truong
(74) *Attorney, Agent, or Firm* — Oliff PLC

(57) ABSTRACT

A rotor includes a plurality of rotor units disposed side by side in an axial direction. The plurality of rotor units each include a rotor core, a plurality of permanent magnets, a plurality of magnetic pole sections and a plurality of magnetic pole bordering sections. At least one of the rotor units has a displacement portion in an outer circumferential surface of the rotor core. The displacement portion is displaced radially inward from respective magnetic pole centers of a circumferentially adjacent pair of the magnetic pole sections toward the magnetic pole bordering section between the pair of the magnetic pole sections. The displacement portion is disposed corresponding to at least one of the magnetic pole bordering sections. The magnetic pole centers of at least one of the rotor units are offset in the circumferential direction with respect to the magnetic pole centers of another of the rotor units.

11 Claims, 9 Drawing Sheets

(56)  References Cited

U.S. PATENT DOCUMENTS

2018/0183285  A1  6/2018  Asano et al.

FOREIGN PATENT DOCUMENTS

| JP | 2016167907 | A | * | 9/2016 |
| JP | 2016220382 | A | * | 12/2016 |
| JP | 2018-085779 | A | | 5/2018 |
| WO | 2018/198866 | A1 | | 11/2018 |

* cited by examiner

ROTOR AND ROTATING ELECTRIC MACHINE

CROSS-REFERENCE TO RELATED APPLICATION

The present application is a continuation application of International Application No. PCT/JP2022/020135, filed on May 13, 2022, which claims priority to Japanese Patent Application No. 2021-081640, filed on May 13, 2021. The contents of these applications are incorporated herein by reference in their entirety.

BACKGROUND

Technical Field

The present disclosure relates to a magnet-embedded rotor and a rotating electric machine.

Background Art

For example, a rotating electric machine including a magnet-embedded rotor is disclosed. The magnet-embedded rotor includes a permanent magnet embedded within a rotor core and obtains not only a magnet torque from the permanent magnet but also a reluctance torque at an outer core section located radially outside the permanent magnet.

SUMMARY

In the present disclosure, provided is a rotor as the following.

The rotor includes a plurality of rotor units disposed side by side in an axial direction. The plurality of rotor units each include a rotor core and a plurality of permanent magnets. The plurality of rotor units each have a plurality of magnetic pole sections and a plurality of magnetic pole bordering sections. At least one of the rotor units has a displacement portion in an outer circumferential surface of the rotor core. The displacement portion is displaced radially inward from respective magnetic pole centers of a circumferentially adjacent pair of the magnetic pole sections toward the magnetic pole bordering section between the pair of the magnetic pole sections. The displacement portion is disposed corresponding to at least one of the magnetic pole bordering sections. The magnetic pole centers of at least one of the rotor units are offset in the circumferential direction with respect to the magnetic pole centers of another of the rotor units.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION OF THE PREFERRED EMBODIMENTS

[PTL 1] JP 2018-85779 A

The present inventors have studied a configuration enabling a reduction of a cogging torque in a magnet-embedded rotor as described above. An object of the present disclosure is to reduce a cogging torque in a magnet-embedded rotor and a rotating electric machine.

According to a first aspect of the present disclosure, a rotor includes a plurality of rotor units disposed side by side in an axial direction. The plurality of rotor units each include a rotor core and a plurality of permanent magnets embedded in the rotor core. The plurality of rotor units each have a plurality of magnetic pole sections provided in a circumferential direction and a plurality of magnetic pole bordering sections that are boundaries between the plurality of magnetic pole sections. The plurality of magnetic pole sections each include the respective permanent magnets. At least one of the plurality of rotor units has a displacement portion in an outer circumferential surface of the rotor core. The displacement portion is displaced radially inward from respective magnetic pole centers of a circumferentially adjacent pair of the magnetic pole sections toward a magnetic pole bordering section between the pair of the magnetic pole sections, the magnetic pole bordering section between the pair of the magnetic pole sections being one of the plurality of magnetic pole bordering sections. The displacement portion is disposed corresponding to at least one of the plurality of magnetic pole bordering sections. The magnetic pole centers of at least one of the rotor units are offset in the circumferential direction with respect to the magnetic pole centers of another of the rotor units.

According to a second aspect of the present disclosure, a rotating electric machine includes: a stator; and the above-described rotor disposed radially inside the stator.

The above-described rotor and rotating electric machine enable a reduction of a cogging torque by virtue of the displacement portion provided in the outer circumferential surface of the rotor core and a skew structure where the magnetic pole centers in the plurality of rotor units are offset in the circumferential direction.

Description will be made below on an embodiment of a rotor and a rotating electric machine.

Figure 1:
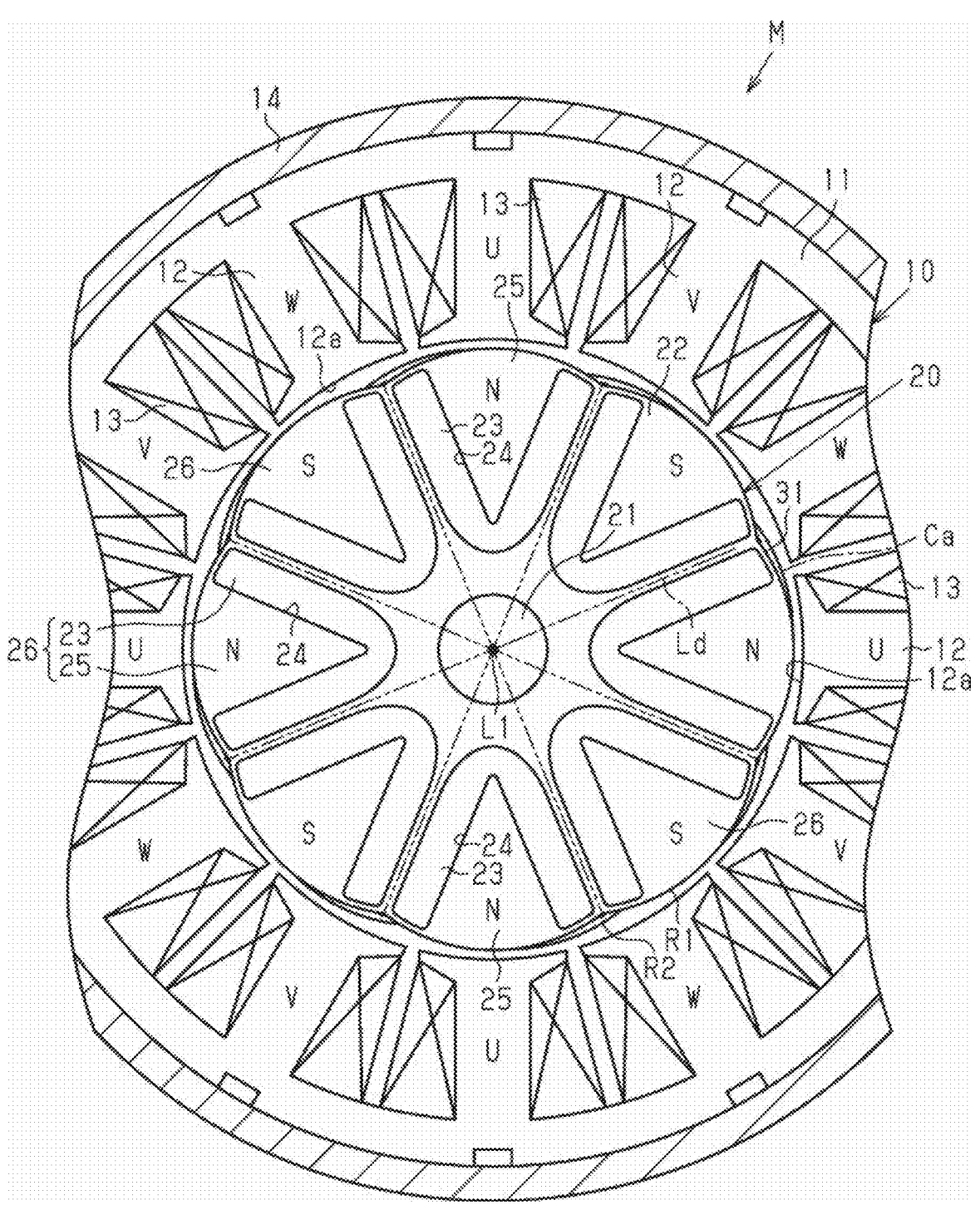
FIG. 1 is a configuration diagram of a rotating electric machine including a magnet-embedded rotor according to an embodiment.

A rotating electric machine M of the present embodiment illustrated in FIG. 1 is a magnet-embedded brushless motor. The rotating electric machine M includes a stator 10 substantially in an annular shape and a rotor 20 substantially in a columnar shape rotatably disposed in a radially inner space of the stator 10.

(Configuration of Stator 10)

The stator 10 includes a stator core 11 substantially in an annular shape. The stator core 11 is made of a magnetic metal material. The stator core 11 is made by, for example, stacking a plurality of electromagnetic steel sheets in an axial direction. The stator core 11 includes teeth 12, in the present embodiment, twelve teeth 12, arranged at regular intervals in a circumferential direction, the teeth 12 extending radially inward. That is to say, the number of slots around which wires are to be wound in the stator 10 is twelve. The teeth 12 are the same in shape as one another. The teeth 12 each have, for example, a distal end portion, that is, a radially inner end portion, substantially in a T-shape. Distal end surfaces 12*a* of the teeth 12 are in the shape of arcs in conformity with an outer circumferential surface of the rotor 20.

Winding wires 13 are concentratedly wound around the teeth 12. For example, a three-phase connection is made, causing the winding wires 13 to individually function as U-phase, V-phase, and W-phase as in an example illustrated in FIG. 1. Then, in response to power supply to the winding wires 13, the stator 10 generates a rotating magnetic field for driving the rotor 20 to rotate. An outer circumferential surface of the stator core 11 of such a stator 10 is fixed to an inner circumferential surface of a housing 14.

(Configuration of Rotor 20)

Figure 2:
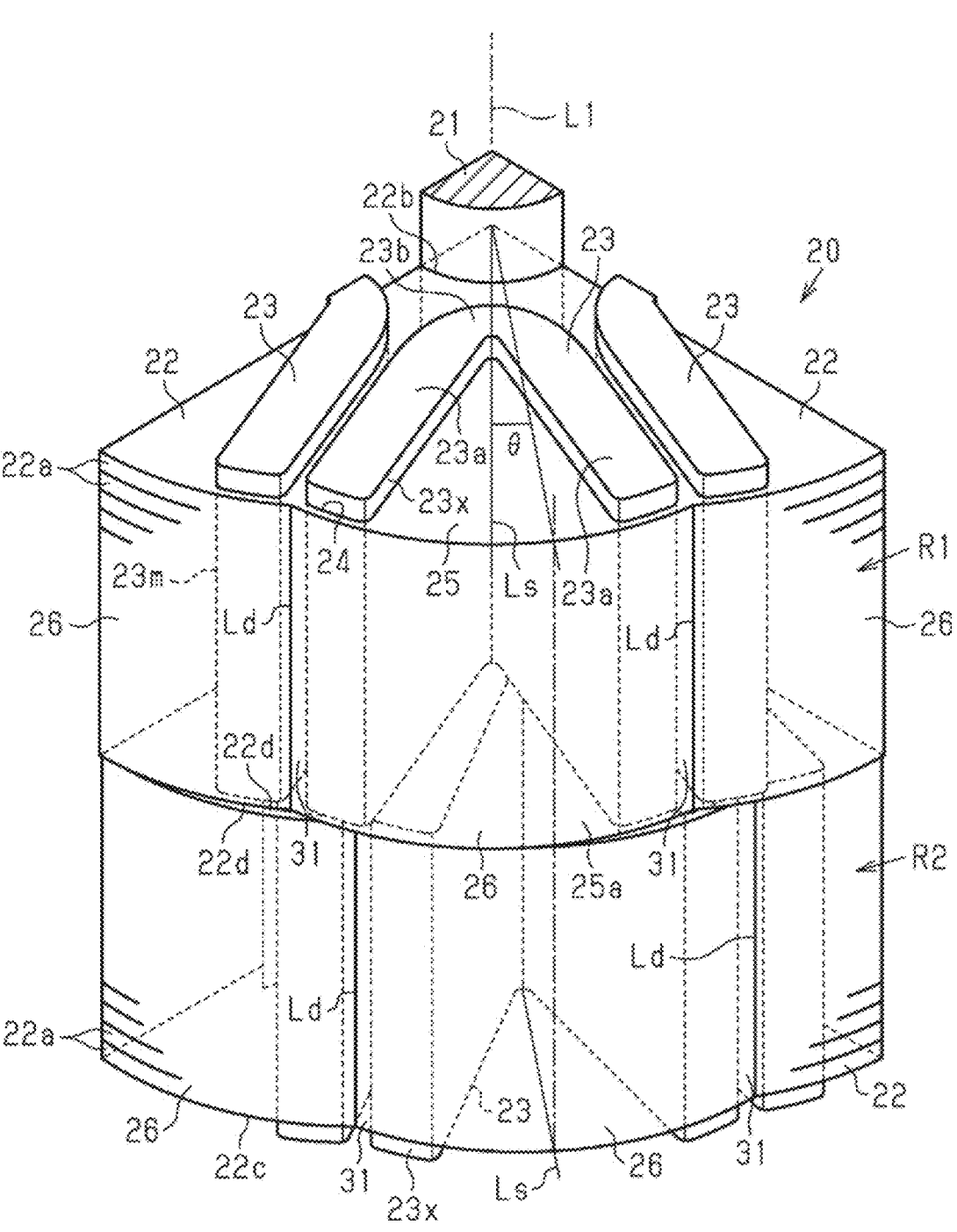
FIG. 2 is a perspective view of the rotor according to the embodiment.

As illustrated in FIG. 2, the rotor 20 includes a rotary shaft 21, a first rotor unit R1 (a rotor unit), and a second rotor unit R2 (a rotor unit). The first rotor unit R1 and the second rotor unit R2 are rotatable together with the rotary shaft 21. The rotary shaft 21 is supported by a non-illustrated bearing provided in the housing 14, which causes the first rotor unit R1 and the second rotor unit R2 to be rotatably disposed with respect to the stator 10. The first rotor unit R1 and the second rotor unit R2 are disposed side by side in an axial direction, that is, a direction along a rotation axis line L1 of the rotor 20. The first rotor unit R1 and the second rotor unit R2 rotate around the rotation axis line L1. For example, the first rotor unit R1 and the second rotor unit R2 have configurations similar to each other. Hereinafter, description will be made on the configurations of the first rotor unit R1 and the second rotor unit R2 by taking the first rotor unit R1 as an example.

As illustrated in FIG. 1, the first rotor unit R1 includes a rotor core 22 substantially in a columnar shape and that has a center portion in which the rotary shaft 21 is fit-inserted. The rotor core 22 is fixed to an outer circumferential surface of the rotary shaft 21. The first rotor unit R1 also includes permanent magnets 23, in the present embodiment, eight permanent magnets 23, embedded within the rotor core 22. The rotor core 22 is made of a magnetic metal material.

The rotor core 22 has magnet accommodation holes 24 for accommodating the permanent magnets 23. In the present embodiment, eight magnet accommodation holes 24 are made at regular intervals in a circumferential direction of the rotor core 22. The magnet accommodation holes 24 are each substantially in a V-shape folded to project radially inward.

The magnet accommodation holes 24 are also the same in shape as one another. The magnet accommodation holes 24 are also made axially throughout the rotor core 22.

As illustrated in FIG. 2, the rotor core 22 is made by, for example, stacking a plurality of core sheets 22*a* in the axial direction, the plurality of core sheets 22*a* being the same in configuration as one another. Each of the core sheets 22*a* is made of, for example, an electromagnetic steel sheet. The core sheets 22*a* are the same in configuration as one another and thus manageable as the same parts.

The permanent magnets 23 of the present embodiment include, for example, a bond magnet made by molding and hardening a magnet material that is a mixture of a magnet powder and a resin. That is to say, with use of the magnet accommodation holes 24 of the rotor core 22 as molds, the permanent magnets 23 are made by filling the magnet accommodation holes 24 with an unhardened magnet material without any gap by injection molding and hardening the magnet material in the magnet accommodation holes 24 after the filling. Accordingly, a hole shape of the magnet accommodation holes 24 is an outline shape of the permanent magnets 23. It should be noted that, for example, a samarium-iron-nitrogen (SmFeN) magnet is used as the magnet powder used for the permanent magnets 23 of the present embodiment but any other rare-earth magnet or the like may be used.

As illustrated in FIG. 1, regions of the rotor core 22 radially outside the respective permanent magnets 23, that is, regions facing the stator 10, function as outer core sections 25 for obtaining a reluctance torque. The first rotor unit R1 includes a plurality of magnetic pole sections 26 including the permanent magnets 23 and the outer core sections 25. The number of the magnetic pole sections 26, which is the same as the number of the permanent magnets 23, is eight in the present embodiment. In short, the number of poles of the first rotor unit R1 is eight. The plurality of magnetic pole sections 26 are the same in shape as one another. The plurality of magnetic pole sections 26 are arranged at regular intervals in the circumferential direction. The magnetic pole sections 26 individually function as north poles and south poles as in an example illustrated in FIG. 1. By virtue of such magnetic pole sections 26, the first rotor unit R1 is configured to obtain both of a magnet torque and a reluctance torque.

(Configuration of Magnetic Pole Section 26)

Figure 3:
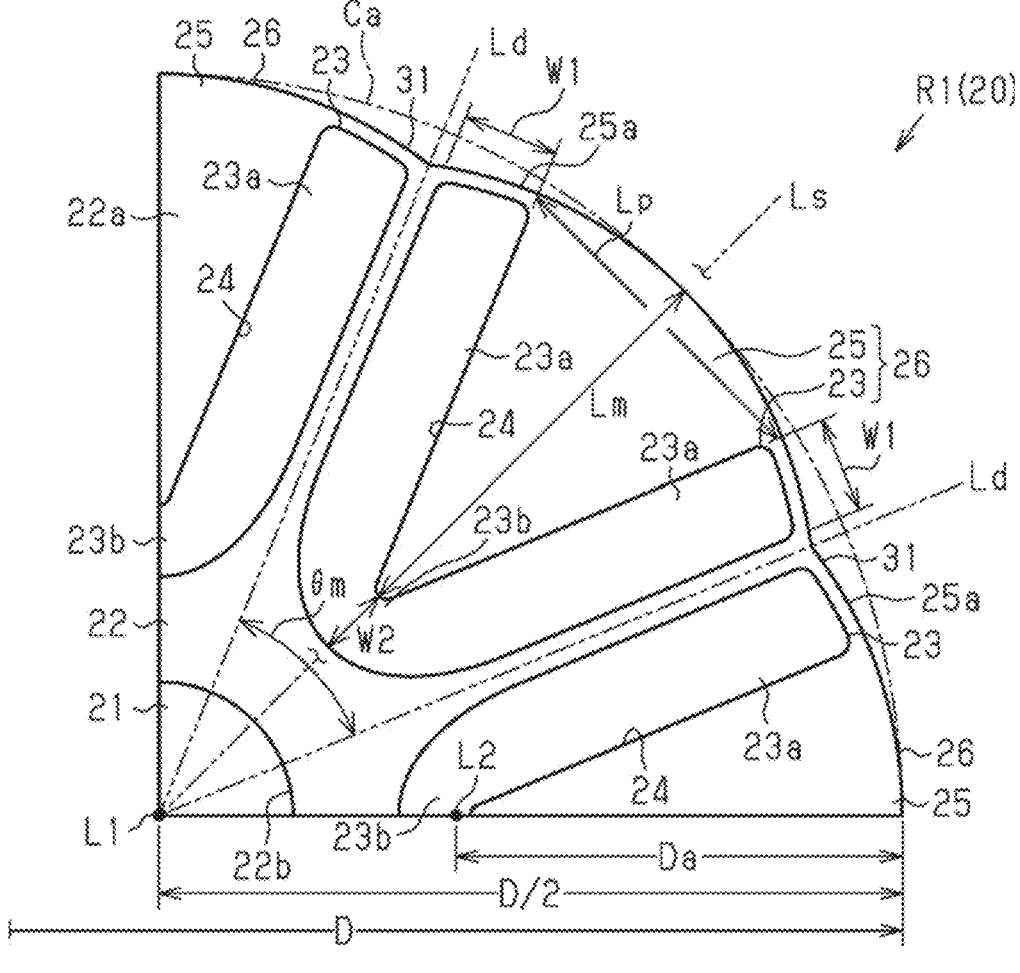
FIG. 3 is a configuration diagram of a first rotor unit according to the embodiment.

As illustrated in FIG. 3, the magnetic pole sections 26 of the first rotor unit R1 have respective magnetic pole centers Ls in the circumferential direction. The magnetic pole centers Ls are set at regular intervals between one another in the circumferential direction. In the present embodiment, the respective magnetic pole centers Ls of the eight magnetic pole sections 26 are set at 45° intervals between one another in the circumferential direction.

The first rotor unit R1 has a plurality of magnetic pole bordering sections Ld, which are boundaries between the plurality of magnetic pole sections 26. The magnetic pole sections 26 are circumferentially adjacent to the adjacent magnetic pole sections 26 with the magnetic pole bordering sections Ld as a boundary. In the first rotor unit R1, the magnetic pole bordering sections Ld as many as the magnetic pole sections 26 are present; in the present embodiment, the number of the magnetic pole bordering sections Ld is eight. The eight magnetic pole bordering sections Ld are set at 45° intervals in the circumferential direction. Additionally, an angle between adjacent ones of the magnetic pole bordering sections Ld, that is, a magnetic pole open angle θm of the magnetic pole sections 26 is 180° in terms of electric angle.

An outer diameter of the rotor core 22, or a distance from the rotation axis line L1 to an outer circumferential surface of the rotor core 22, is uneven in the circumferential direction. Specifically, the outer diameter of the rotor core 22 is maximized at each of the magnetic pole centers Ls and minimized at each of the magnetic pole bordering sections Ld. In FIG. 3, a circle having the same diameter as a maximum diameter of the rotor core 22 is illustrated as a reference circle Ca. Additionally, in FIG. 3, D denotes the diameter of the reference circle Ca and D/2 denotes a radius of the reference circle Ca.

The outer core section 25 in each of the magnetic pole sections 26 has a radially outer surface, namely, an outer surface 25a. The outer surface 25a is a surface facing the distal end surfaces 12a of the teeth 12. The outer surface 25a is in the shape of an arc around a center axis L2 as viewed in the axial direction. The center axis L2 of the arc defining the outer surface 25a is an axis parallel with the rotation axis line L1 of the rotor 20 and not in alignment with the rotation axis line L1. Additionally, the center axis L2 is set within a range surrounded by the reference circle Ca. Additionally, the center axis L2 is set at the same position as the magnetic pole center Ls in the circumferential direction. Additionally, a radius Da of the arc defining the outer surface 25a is smaller than the radius (D/2) of the reference circle Ca.

That is to say, the outer circumferential surface of the rotor core 22 has a plurality of displacement portions 31. For example, the displacement portions 31 are disposed corresponding one-to-one to all the eight magnetic pole bordering sections Ld of the first rotor unit R1. In short, the displacement portions 31 are disposed at point-symmetric positions around the rotation axis line L1 of the rotor 20. The displacement portions 31 are each displaced radially inward from the respective magnetic pole centers Ls of a pair of the magnetic pole sections 26 circumferentially adjacent to each other toward the magnetic pole bordering section Ld between the pair of magnetic pole sections 26. Additionally, the displacement portions 31 each have a shape defined by the two arcs around the center axes L2 as viewed in the axial direction. That is to say, the displacement portions 31 are each the most distant radially inward from the reference circle Ca at an intersection between circumferentially adjacent ones of the outer surfaces 25a. It should be noted that the intersection between the circumferentially adjacent outer surfaces 25a is set on the magnetic pole bordering section Ld. Additionally, for example, the displacement portions 31 are each uniformly formed from an axial one end to the axial opposite end of the magnetic pole bordering section Ld. In short, the rotor core 22 has a configuration where the respective displacement portions 31 formed in the core sheets 22a are at the same position in the circumferential direction.

(Configuration of Permanent Magnet 23)

The permanent magnets 23 are each, for example, substantially in a V-shape folded to project radially inward. In detail, the permanent magnets 23 are each in a shape where radially inner end portions of a pair of linear portions 23a are connected to each other by a bent portion 23b as illustrated in FIG. 3. Respective radially outer end portions of the linear portions 23a are located near the outer circumferential surface of the rotor core 22. The permanent magnets 23 are each, for example, in a line-symmetric shape with respect to the magnetic pole center Ls. Additionally, the linear portions

23a of the permanent magnets 23 are close to the respective magnetic pole bordering sections Ld.

W1 denotes a thickness of the linear portions 23a of the permanent magnets 23 as viewed in the axial direction. Additionally, W2 denotes a thickness of the bent portions 23b of the permanent magnets 23 as viewed in the axial direction. The thickness W1 of the linear portions 23a is a thickness in a direction perpendicular to an extending direction of each of the linear portions 23a as viewed in the axial direction. The thickness W1 of the linear portions 23a is, for example, uniform in the extending direction of each of the linear portions 23a. Additionally, for example, the linear portions 23a are the same in thickness W1. The thickness W2 of the bent portion 23b is a thickness of the bent portion 23b on the magnetic pole center Ls. In the present embodiment, the thickness W1 of the linear portions 23a is larger than the thickness W2 of the bent portion 23b. It should be noted that positions of the center axes L2 of the arcs defining the displacement portions 31 in the magnetic pole sections 26 are set such that the positions overlap with the respective bent portions 23b.

A dimension between intersections of extended lines of the inner surfaces of the linear portions 23a of each of the permanent magnets 23 in a V-shape with the outer circumferential surface of the rotor core 22 is defined as a magnetic pole pitch Lp. Additionally, a dimension from the outer circumferential surface of the rotor core 22 to an inner surface of the bent portion 23b an the magnetic pole center Ls is defined as an embedding depth Lm. The permanent magnets 23 of the present embodiment are set in a deeply folded shape such that the embedding depth Lm becomes larger than the magnetic pole pitch Lp. In short, a magnet surface of each of the permanent magnets 23 of the present embodiment defined by the respective inner surfaces of the linear portions 23a and the bent portion 23b is set larger than a magnet surface of a known surface magnet type (not illustrated). Additionally, the embedding depth Lm is set larger, which causes the bent portion 23b of the permanent magnet 23 to be located on a radially inner side close to a fit-insertion hole 22b; in which the rotary shaft 21 at the center portion of the rotor core 22 is fit-inserted. It should be noted that the above folded shape of the permanent magnets 23 is by way of example and may be altered, if necessary; a shape with the shallow embedding depth Lm, a folded shape with the large bent portion 23b such as a substantial U-shape, and the like are also possible.

Figure 4:
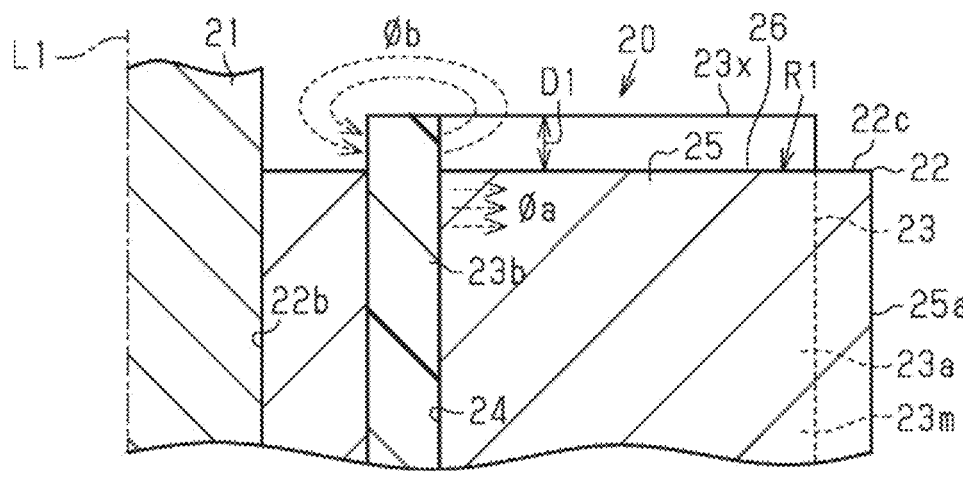
FIG. 4 is a cross-sectional view of the rotor according to the embodiment.
Figure 5:
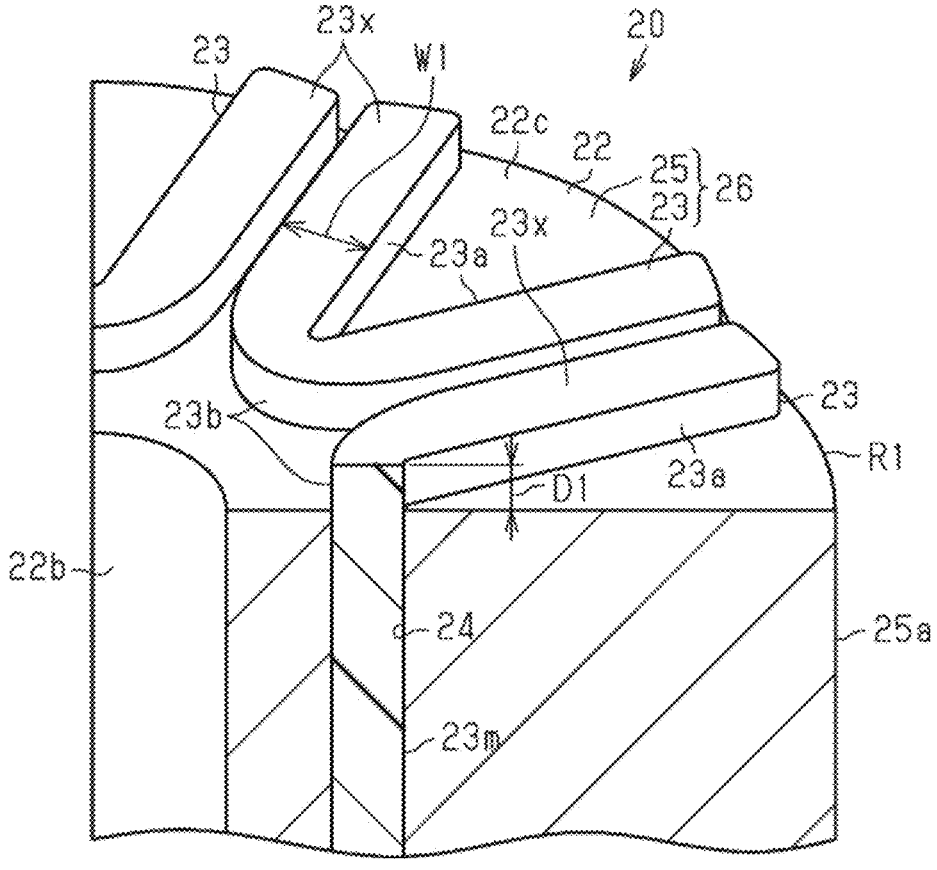
FIG. 5 is a perspective view of the rotor according to the embodiment.

As illustrated in FIG. 4 and FIG. 5, the permanent magnets 23 of the first rotor unit R1, for example, partially protrude from an axial one end surface 22c of the rotor core 22. The permanent magnets 23 each include an embedded magnet portion 23m within the magnet accommodation hole 24 and a protruding portion 23x protruding from the end surface 22c of the rotor core 22. It should be noted that the end surface 22c of the rotor core 22 and an end surface 22d opposite in the axial direction to the end surface 22c are, for example, flat surfaces. It should be noted that a part of the permanent magnets 23 do not protrude in the axial direction from the end surface 22d in the present embodiment. The protruding portion 23x of each of the permanent magnets 23 is easily producible merely by making a recessed portion for forming the protruding portion 23x in a non-illustrated mold for closing the magnet accommodation hole 24 open in the end surface 22c of the rotor core 22.

The protruding portion 23x is provided, for example, in each of the linear portions 23a and the bent portion 23b. That is to say, the protruding portion 23x is continuous through a V-shaped path including the linear portions 23a and the bent portion 23b of the permanent magnet 23. The protruding portion 23x is disposed on the end surface 22c of the rotor core 22. The protruding portion 23x is continuously and integrally formed from the same type of material with the embedded magnet portion 23m of the permanent magnet 23 located within the magnet accommodation hole 24 of the rotor core 22.

The protruding portion 23x is an end portion of the permanent magnet 23 located on the end surface 22c of the rotor core 22 and functions to cause a leakage magnetic flux φb illustrated in FIG. 4, which is likely to be generated in the end portion of the permanent magnet 23, to be generated in this region. In other words, more of a magnetic flux of the embedded magnet portion 23m of the permanent magnet 23 located within the rotor core 22 is caused to flow along a radial direction without externally leaking from the end surface 22c of the rotor core 22. Then, more magnetic flux is caused to become an effective magnetic flux φa contributing to a torque of the rotating electric machine M. The protruding portion 23x is set such that the effective magnetic flux φa is increased and the protruding portion 23x has an appropriate protruding amount D1 from the end surface 22c of the rotor core 22. It should be noted that as for the protruding amount D1 of the protruding portion 23x, an illustrated dimension may be different from an actual dimension.

After a magnet material is hardened, the permanent magnets 23, which are mainly disposed within the magnet accommodation holes 24 of the rotor core 22, are magnetized from outside the rotor core 22 using a non-illustrated magnetization device to cause the permanent magnets 23 to inherently function as magnets. The permanent magnets 23 are magnetized such that the permanent magnets 23 alternately have different poles in the circumferential direction of the rotor core 22. Additionally, the permanent magnets 23 are each magnetized in its own thickness direction.

As illustrated in FIG. 2, the protruding portions 23x are provided in each of the first rotor unit R1 and the second rotor unit R2. The first rotor unit R1 and the second rotor unit R2 are disposed side by side, for example, in a manner to cause the respective end surfaces 22d thereof, from which none of the permanent magnets 23 protrude, to face each other in the axial direction. In the present embodiment, for example, the first rotor unit R1 and the second rotor unit R2 are disposed side by side with the end surfaces 22d being in contact with each other. Assuming the first rotor unit R1 and the second rotor unit R2 as one block, the protruding portions 23x are disposed on both axial sides of the block. (Skew Structure)

Magnetic pole sections 26 of the second rotor unit R2 are offset in the circumferential direction with respect to the magnetic pole sections 26 of the first rotor unit R1. In the present embodiment, the first rotor unit R1 and the second rotor unit R2 are the same in configuration as each other and the rotor 20 has a configuration where the second rotor unit R2 is rotated by a predetermined angle with respect to the first rotor unit R1. This causes the magnetic pole sections 26 of the second rotor unit R2 to be offset in the circumferential direction by the predetermined angle with respect to the respective magnetic pole sections 26 of the first rotor unit R1. It should be noted that description will be made below with the assumption that a circumferential offset angle of magnetic pole centers Ls of the second rotor unit R2 relative to the magnetic pole centers Ls of the first rotor unit R1 is defined as a skew angle θ.

In the present embodiment, the skew angle θ[°] is set such that Expression (a) below is satisfied, where p denotes the number of poles of the rotor 20 and L denotes the least common multiple of the number of poles p and the number of slots of the stator 10.

$$(180/L)-16/p \le \theta \le (180/L)+36/p \tag{a}$$

The number of poles p of the rotor 20, which is the number of the magnetic pole sections 26 of each of the first rotor unit R1 and the second rotor unit R2, is eight in the present embodiment. Additionally, the number of slots is twelve in the present embodiment. That is to say, the skew angle θ is set within a range determined by plugging p=8 and L=24 in Expression (a), or range of 5.5°≤θ≤12.0°, in the present embodiment.

Description will be made on the workings of the rotor 20 of the rotating electric machine M of the present embodiment.

Figure 6:
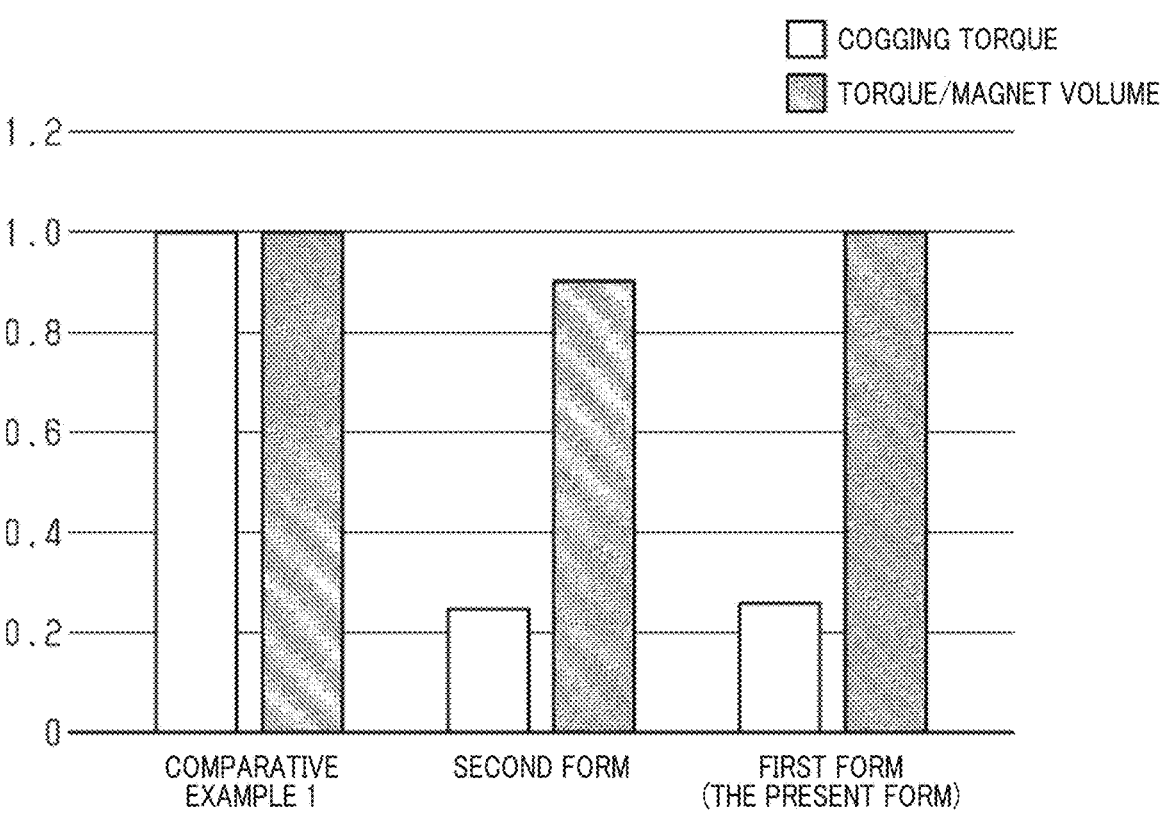
FIG. 6 is an explanatory diagram for explaining the characteristics of the rotating electric machine according to the embodiment.

FIG. 6 is a comparative result between, a first form, a second form, and Comparative Example 1, the first form being the present form.

The first form is the above-described embodiment. In short, in the first form, the outer circumferential surface of the outer rotor core 22 has the above-described configuration, that is, the configuration where the outer surface 25a of the outer core section 25 of each of the magnetic pole sections 26 is in the arc shape around the center axis L2. Additionally, in the first form, the permanent magnets 23 of each of the first rotor unit R1 and the second rotor unit R2 each have the protruding portion 23x.

In the second form, each of the first rotor unit R1 and the second rotor unit R2 of the above-described embodiment has a configuration where the protruding portions 23x of the permanent magnets 23 are omitted. That is to say, in the configuration, the permanent magnets 23 do not protrude in the axial direction from the magnet accommodation holes 24. Except for the above, the configuration of the second form is similar to that of the first form.

In Comparative Example 1, each of the first rotor unit R1 and the second rotor unit R2 has a configuration where the shape of the outer circumferential surface of the rotor core 22 as viewed in the axial direction is a circle along the reference circle Ca. That is to say, either the first rotor unit R1 or the second rotor unit R2 of Comparative Example 1 has no displacement portion 31. Additionally, in Comparative Example 1, each of the first rotor unit R1 and the second rotor unit R2 has a configuration where the permanent magnets 23 do not protrude in the axial direction from the magnet accommodation holes 24. It should be noted that the magnitude of the skew angle θ between the first rotor unit R1 and the second rotor unit R2 is equal in the first form, the second form, and Comparative Example 1.

FIG. 6 illustrates the magnitude of a cogging torque generated in a rotating electric machine and a ratio between the torque and the volume of the permanent magnets 23 (torque/magnet volume) in each of Comparative Example 1, the first form, and the second form. It should be noted that the comparison in the drawing is a comparison of the first form and the second form made with the assumption that Comparative Example 1 is defined as 1.0. As illustrated in the drawing, the first form and the second form with the displacement portions 31 are sufficiently smaller than Comparative Example 1 with no displacement portion 31 in terms of cogging torque. Additionally, the second form is slightly smaller than the first form in terms of cogging torque.

The first form is almost comparable to Comparative Example 1 in terms of ratio (torque/magnet volume). Additionally, the first form is slightly larger than the second form in terms of ratio (torque/magnet volume).

Figure 7:
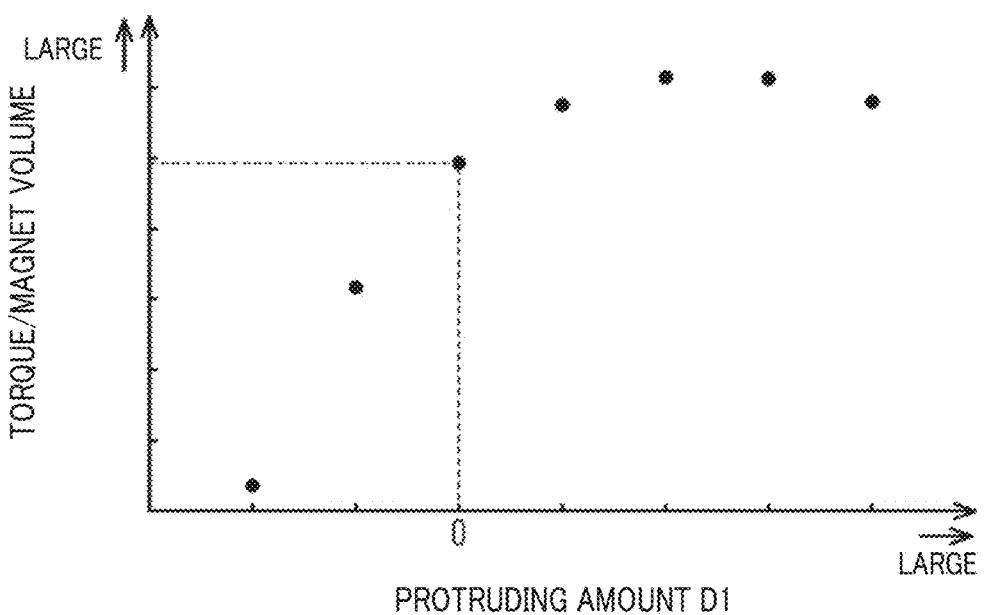
FIG. 7 is an explanatory diagram for explaining the characteristics of the rotating electric machine according to the embodiment.

FIG. 7 illustrates a relationship between the protruding amount D1 of protruding portions 23x and the ratio (torque/magnet volume) the above-described embodiment. As illustrated in the drawing, it has been found that by virtue of the protruding amount D1 of the protruding portions 23x being equal to or more than zero, that is, the protruding portions 23x being provided, the ratio (torque/magnet volume) rises with an increase of the effective magnetic flux φa. Additionally, even when the protruding amount D1 becomes equal to or less than zero, the ratio (torque/magnet volume) rises for a while and then gradually falls. This is assumed to result from keeping the magnet volume small by preventing the magnetic flux of the embedded magnet portions 23m of the permanent magnets 23 from leaking from the end surface 22c of the rotor core 22 as much as possible and making the thickness W2 of the bent portions 23b thinner than the thickness W1 of the linear portions 23a. The protruding amount D1 is set at an appropriate value in consideration of the relationship with the ratio (torque/magnet volume) as illustrated in FIG. 7. It is also favorable that an increase of the protruding amount D1, which leads to an increase of the weight of the rotor 20, an increase of the magnet material of the permanent magnets 23, and the like, be taken into consideration in setting the protruding amount D1.

Figure 8:
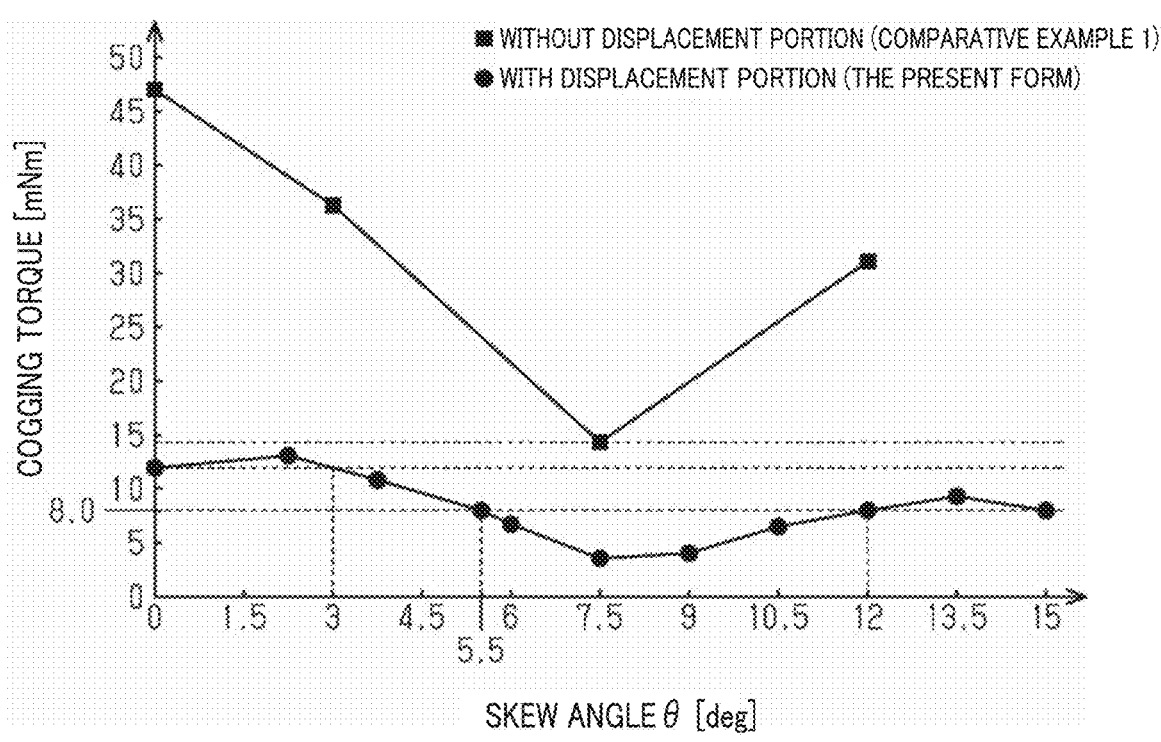
FIG. 8 is an explanatory diagram for explaining the characteristics of the rotating electric machine according to the embodiment.

FIG. 8 is a graph illustrating a relationship between the skew angle θ and the magnitude of the cogging torque in each of the present form and Comparative Example 1. The present form is the above-described embodiment. Comparative Example 1 in the drawing is similar to Comparative Example 1 described above. That is to say, Comparative Example 1 has a configuration where either the first rotor unit R1 or the second rotor unit R2 has no displacement portion 31.

In FIG. 8, a configuration where the skew angle θ is 0° is a configuration where the positions of the magnetic pole centers Ls in the circumferential direction in the first rotor unit R1 are in alignment with the respective positions of the magnetic pole centers Ls in the circumferential direction in the second rotor unit R2. In both of the present form and Comparative Example 1, a cogging torque reaches the minimum at the skew angle θ of 7.5°, approximately. This is because when the skew angle θ is 7.5°, approximately, the phase of a cogging torque generated in the first rotor unit R1 and the phase of a cogging torque generated in the second rotor unit R2 become opposite to each other and the cogging torques are almost countered by each other.

It should be noted that the skew angle θ at which the phase of the cogging torque generated in the first rotor unit R1 and the phase of the cogging torque generated in the second rotor unit R2 become opposite varies with the number of poles of the rotor 20 and the number of slots of the stator 10. In detail, a cycle of the cogging torque is usually a value made by dividing 360 degrees by the least common multiple of the number of poles of the rotor 20 and the number of slots of the stator 10. Then, the skew angle θ is set at a half of the cycle of the cogging torque, which makes it possible to cause the phase of the cogging torque generated in the first rotor unit R1 and the phase of the cogging torque generated in the second rotor unit R2 to become opposite. In the present embodiment, the number of poles of the rotor 20 is eight and the number of slots of the stator 10 is twelve, so that the least common multiple is twenty-four. In short, the cycle of the cogging torque is 360/24=15(°). Thus, when the skew angle θ is a half of the cycle of the cogging torque, or 7.5°, the phase of the cogging torque generated in the first rotor unit R1 and the phase of the cogging torque generated in the second rotor unit R2 become opposite.

In Comparative Example 1, as long as the skew angle θ is in a range from 0° to 7.5°, approximately, the cogging torque decreases with an increase of the skew angle θ from 0°. Then, the cogging torque reaches the minimum at the skew angle θ of 7.5, approximately. The cogging torque increases from the minimum value with an increase of the skew angle θ from 7.5°, approximately.

In the present form, as long as the skew angle θ is in a range from 0° to 2.0°, approximately, the cogging torque increases with an increase of the skew angle θ from 0°. As long as the skew angle θ is in a range from 2.0° to 7.5°, the cogging torque decreases with an increase of the skew angle θ from 0°. Then, the cogging torque reaches the minimum at the skew angle θ of 7.5, approximately. Additionally, the cogging torque increases from the minimum value with an increase of the skew angle θ from 7.5°, approximately.

In Comparative Example 1, the cogging torque reaches the minimum when the skew angle θ is 7.5°, approximately. In contrast, although the cogging torque reaches the maximum when the skew angle θ is 2.0° in the present form, the maximum value of the cogging torque is smaller than the minimum value of the cogging torque in Comparative Example 1. That is to say, employment of the present form with the displacement portions 31 makes it possible to reduce the cogging torque more than in Comparative Example 1 with no displacement portion 31 irrespective of the magnitude of the skew angle θ.

In the present form, when the skew angle θ is 3.0°, approximately, the multitude of the cogging torque becomes comparable to when the skew angle θ is 0°. That is to say, when the skew angle θ is larger than 3.0°, approximately, the cogging torque is smaller than when the skew angle θ is 0°.

In the present form, the cogging torque is equal to or less than 8 [mNm] at the skew angle θ in the range of 5.5°≤θ≤12.0°. Accordingly, it is possible to reduce the cogging torque to 8.0 [mNm] or less by setting the skew angle θ in the range of 5.5°≤θ≤12.0°. In the present form, when the skew angle θ is 0°, the cogging torque is 12.0 [mNn], approximately. That is to say, it is possible to reduce the cogging torque to substantially two thirds as compared with when the skew angle θ is 0° by setting the skew angle θ in the range of 5.5°≤θ≤12.0°.

In contrast, in Comparative Example 1, even in a case where the skew angle θ is set at 7.5°, at which the cogging torque reaches the minimum, it is only possible to reduce the magnitude of the cogging torque to substantially 14.0 [mNm]. Accordingly, the skew angle θ is set in the range of 5.5°≤θ≤12.0° in the present form, which makes it possible to reduce the cogging torque to a level extremely difficult to reach in Comparative Example 1. Incidentally, it is preferable that the skew angle θ be set close to 7.5°, at which the cogging torque reaches the minimum, in the present form. In addition, even in consideration of manufacturing tolerance, it is preferable that the skew angle θ be set such that the skew angle θ falls within the range of 5.5°≤θ≤12.0°.

Figure 9:
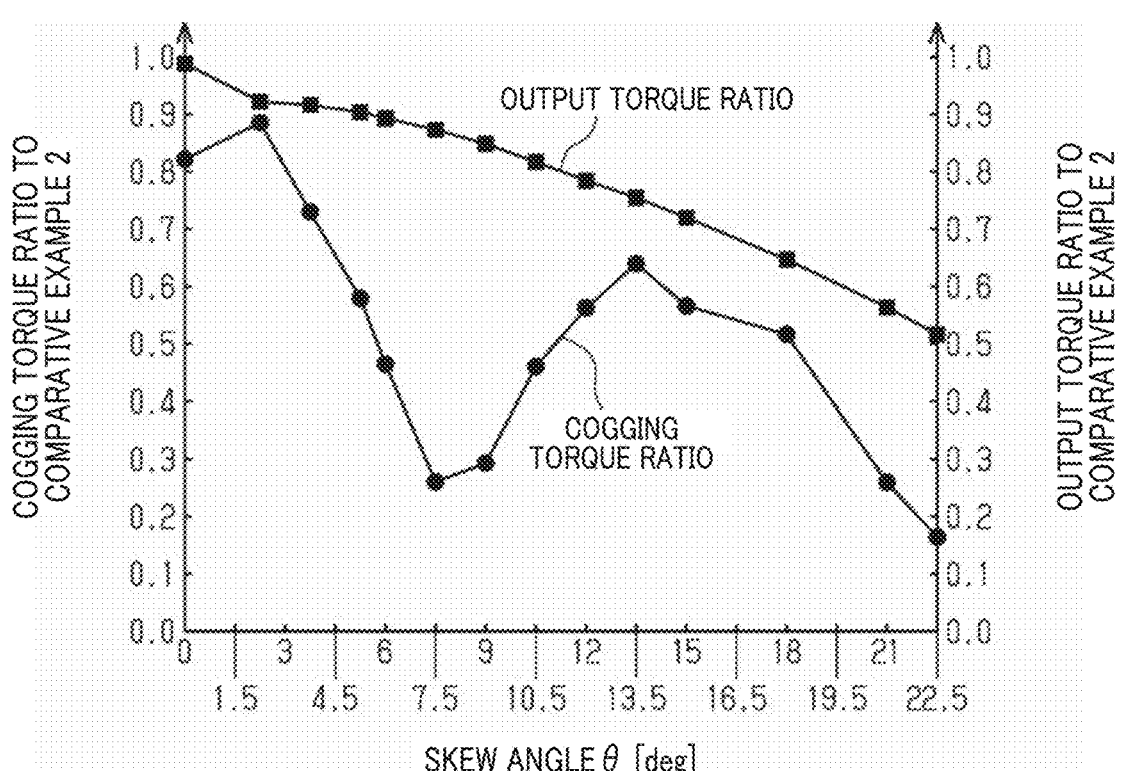
FIG. 9 is an explanatory diagram for explaining the characteristics of the rotating electric machine according to the embodiment.

FIG. 9 illustrates relationships between the skew angle θ and a cogging torque ratio and an output torque ratio. FIG. 9 illustrates a ratio of a cogging torque of the present form to Comparative Example 2. FIG. 9 also illustrates a ratio of an output torque of the present form to Comparative Example 2. Comparative Example 2 has a configuration where the skew angle θ is set at 7.5° in Comparative Example 1 with no displacement portion 31.

As illustrated in the drawing, the cogging torque ratio of the present form to Comparative Example 2 transitions as in the graph in FIG. 8. In a range of the skew angle θ from 7.5° to 13.5°, the cogging torque ratio increases with an increase of the skew angle θ and the skew angle θ peaks for the second time at 13.5°. Then, in a range of the skew angle θ from 13.5° to 22.5°, the cogging torque ratio decreases with an increase of the skew angle θ.

The output torque ratio of the present form to Comparative Example 2 is 1.0, approximately, when the skew angle θ is 0°. Then, the output torque ratio decreases with an increase of the skew angle θ from 0°. Thus, in a range of the skew angle θ from 21.0° to 22.5°, while the cogging torque ratio decreases as compared with when the skew angle θ 7.5°, the output torque ratio also decreases. Accordingly, in order to secure the output torque and reduce the cogging torque, it is preferable to set the skew angle θ in the range of 5.5°≤θ≤12.0°. It should be noted that an increase of the skew angle θ leads to an increase of an offset in the circumferential direction between the respective permanent magnets 23 of the first rotor unit R1 and the second rotor unit R2, increasing a leakage magnetic flux therebetween. This is thought to lower the output torque.

Description will be made on effects of the present embodiment.

(1) The outer circumferential surface of the rotor core 22 of each of the first rotor unit R1 and the second rotor unit R2 has the displacement portions 31 corresponding one-to-one to the plurality of magnetic pole bordering sections Ld. The displacement portions 31 are each displaced radially inward from the respective magnetic pole centers Ls of a circumferentially adjacent pair of the magnetic pole sections 26 toward the magnetic pole bordering section Ld between the pair of magnetic pole sections 26. In the regions having the displacement portions 31, air gaps between the outer circumferential surface of the rotor core 22 and the distal end surfaces 12*a* of the teeth 12 are wider at the magnetic pole bordering sections Ld than at the magnetic pole centers Ls. This serves to smoothen switching between the magnetic poles during the rotation of the rotor 20, thus making it possible reduce the cogging torque. Additionally, the magnetic pole centers is of the second rotor unit R2 are offset in the circumferential direction with respect to the magnetic pole centers Ls of the first rotor unit R1. This causes the cogging torque generated in the first rotor unit R1 and the cogging torque generated in the second rotor unit R2 to interfere with each other, thus making it possible to reduce the cogging torque in the rotor 20 as a whole. As seen above, by virtue of the displacement portions 31 provided in the outer circumferential surface of the rotor core 22 and the skew structure where the respective magnetic pole centers Ls of the first rotor unit R1 and the second rotor unit R2 are offset in the circumferential direction, it is possible to favorably reduce the cogging torque.

(2) The displacement portions 31 are in the shape of arcs approaching the rotation axis line L1 of the rotor 20 from the magnetic pole centers Ls toward the magnetic pole bordering sections Ld as viewed in the axial direction. This configuration causes the displacement portions 31 to be gradually displaced radially inward from the magnetic pole centers Ls toward the magnetic pole bordering sections Ld. This makes it possible for the displacement portions 31 to more favorably reduce the cogging torque.

(3) The respective magnetic pole sections 26 of the first rotor unit R1 and the second rotor unit R2 are the same in number. Moreover, the magnetic pole sections 26 of each of the first rotor unit R1 and the second rotor unit R2 are disposed at regular intervals in the circumferential direction. By virtue of this configuration, the first rotor unit R1 and the second rotor unit R2 are configured the same as each other to facilitate parts management and it is possible to obtain a skew structure in which the respective magnetic pole centers Ls are offset from each other by rotating the second rotor unit R2 only by a predetermined angle with respect to the first rotor unit R1.

(4) The permanent magnets 23 are in the folded shape projecting radially inward. This configuration makes it possible to secure large surface areas of the permanent magnets 23 facing the outer core sections 25. This makes it possible to improve a magnet torque.

(5) Each of the first rotor unit R1 and the second rotor unit R2 includes the plurality of displacement portions 31, which are disposed at the point-symmetric positions around the rotation axis line L1 of the rotor 20. This configuration makes it possible to reduce unbalance of a load in the rotor 20 even though the displacement portions 31 are provided and, consequently, reduce vibrations.

(6) The rotor core 22 includes the plurality of core sheets 22*a* with the configurations that are the same as each other. The plurality of core sheets 22*a* are stacked in the axial direction. This configuration makes it possible to facilitate regions management of plurality of core sheets 22*a* even though the rotor core 22 has the stacked structure of the plurality of core sheets 22*a*.

(7) In each of the first rotor unit R1 and the second rotor unit R2, the displacement portions 31 of the plurality of core sheets 22*a* are at the same position in the circumferential direction. This configuration eliminates the necessity for the core sheets 22*a* to be stacked while rotated in assembling the rotor core 22, allowing for simplification of manufacturing.

(8) In each of the first rotor unit R1 and the second rotor unit R2, the permanent magnets 23 have the protruding portions 23*x* protruding from the axial end surface 22*c* of the rotor core 22. This configuration causes die leakage magnetic flux φh generated in the end portions of the permanent magnets 23 to be concentratedly generated in the protruding portions 23*x*. Additionally, as for the embedded magnet portions 23*m* of the permanent magnets 23 located within the rotor cores 22, a path of magnetic flux leaking from the axial end surface 22*c* of the rotor core 22 extends beyond the protruding portions 23*x*, and a path length of the magnetic flux becomes elongated. Thus, leakage of the magnetic flux in the embedded magnet portions 23*m* from the end surface 22*c* of the rotor core 22 is reduced to cause the magnetic flux generated in the embedded magnet portion 23*m* to flow axially throughout the inside of the rotor core 22 along the radial direction. This causes much of the magnetic flux generated axially throughout the embedded magnet portions 23*m* to become the effective magnetic flux φa contributing to the torque of the rotating electric machine M, allowing for increasing the magnetic flux amount of the effective magnetic flux φa.

(9) The skew angle θ[°] is set such that $(180/L)-16/p \le \theta \le (180/L)+36/p$ is satisfied, where p denotes the number of poles of the rotor 20 and L denotes the least common multiple of the number of slots of the stator 10 around which wires are to be wound and the number of poles p of the rotor 20. This configuration makes it possible to more favorably reduce the cogging torque.

(10) It is possible to reduce the cogging torque more than the skew angle θ is 0° by setting the skew angle θ at 3.0° or more.

(11) The number of poles of the rotor 20 is eight and the number of slots of the stator 10 around which wires are to be wound is twelve. This configuration makes it possible to reduce the cogging torque in the 8-pole 12-slot rotating electric machine M.

The present embodiment may be modified as follows and implemented. The present embodiment and the following modification examples may be implemented in combination with each other within a technically consistent scope.

In the first rotor unit R1 and the second rotor unit R2 of the above-described embodiment, all the magnetic pole bordering sections Ld are provided with the respective displacement portions 31 but this is not a limitation. Only a part of the magnetic pole bordering sections Ld may be provided with the displacement portions 31.

Figure 10:
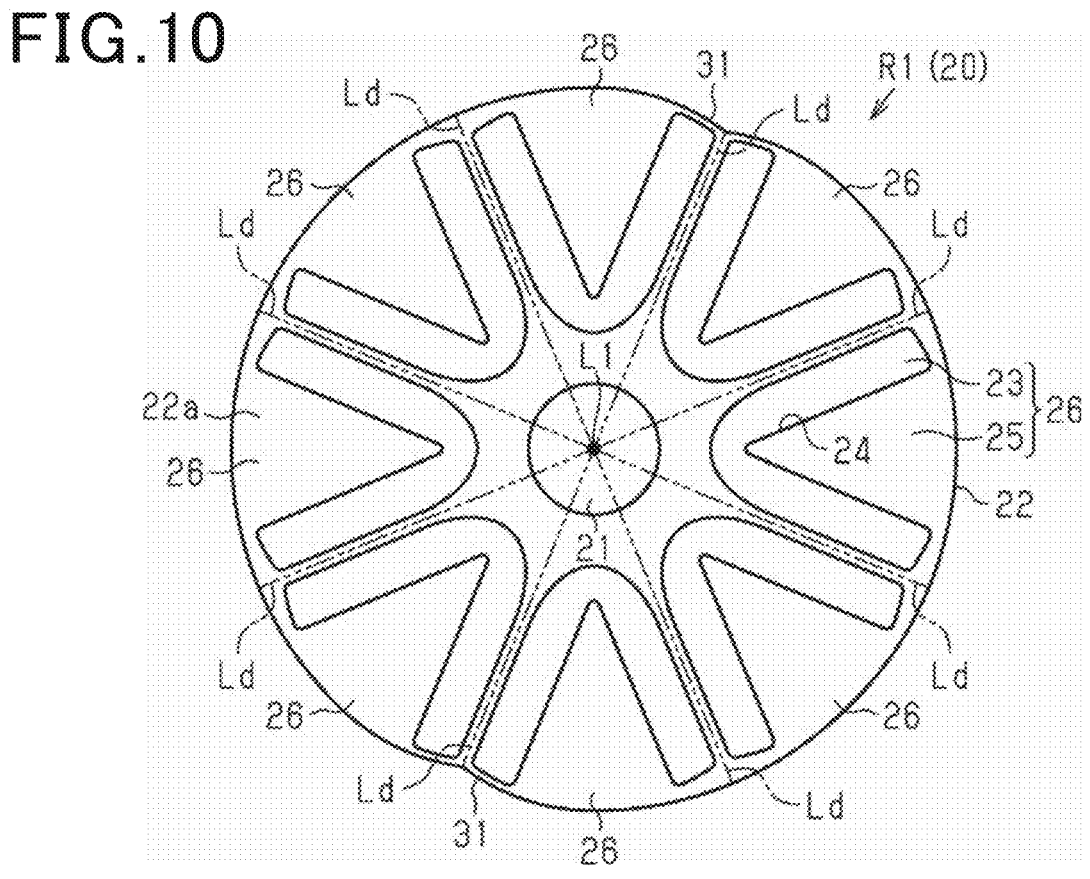
FIG. 10 is a plan view of a first rotor unit of a modification example.

For example, two of the eight magnetic pole bordering sections Ld may be provided with the displacement portions 31 as illustrated in FIG. 10. In a configuration illustrated in the drawing, the displacement portions 31 are provided on the respective magnetic pole bordering sections Ld at 180° opposite positions. That is to say, the two displacement portions 31 are provided at point-symmetric positions around the rotation axis line L1. It should be noted that the outer circumferential surface of the rotor core 22 at each of the rest of the magnetic pole bordering sections Ld, which are provided with no displacement portion 31, is in the shape of an arc along the reference circle Ca illustrated in FIG. 3.

Figure 11:
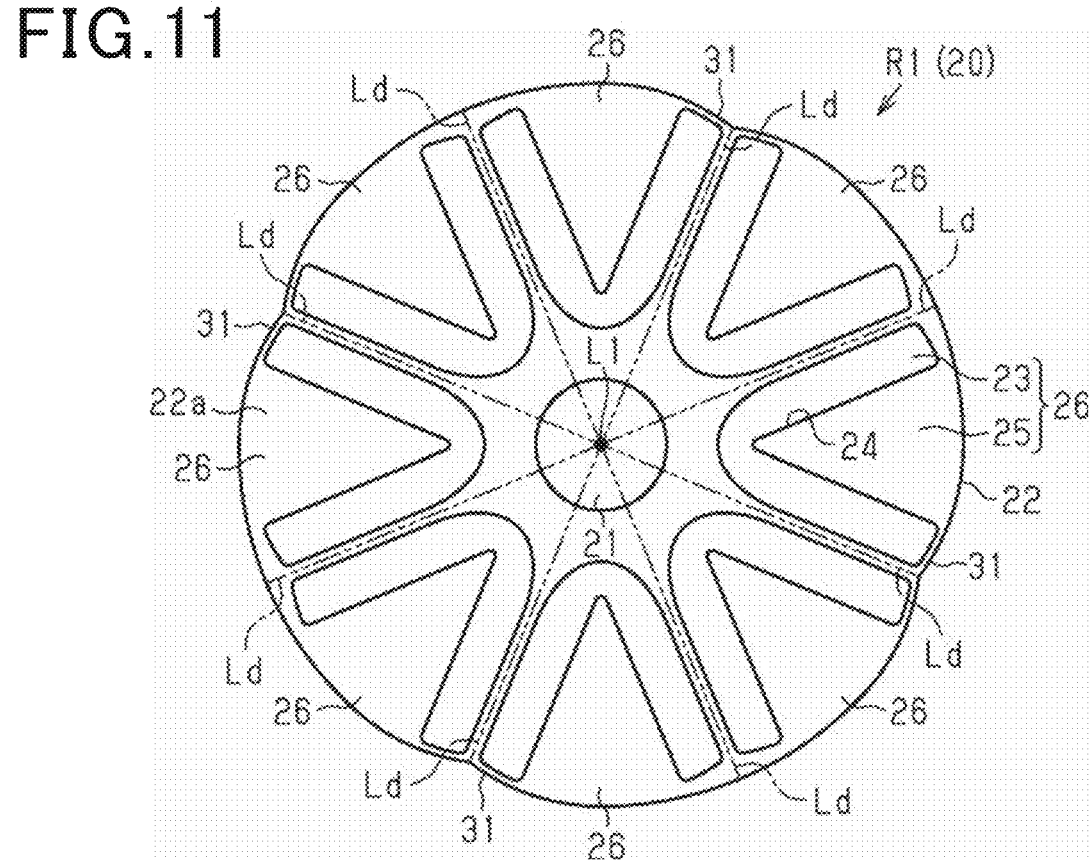
FIG. 11 is a plan view of a first rotor unit of a modification example.

Additionally, for example, four of the eight magnetic pole bordering sections Ld may be provided with the displacement portions 31 as illustrated in FIG. 11. In a configuration illustrated in the drawing, the displacement portions 31 are provided on the respective magnetic pole bordering sections Ld at positions at 90° intervals in the circumferential direction. That is to say, the four displacement portions 31 are provided at point-symmetric positions around the rotation axis line L1. Additionally, the magnetic pole bordering sections Ld with the displacement portions 31 and the magnetic pole bordering sections Ld with no displacement portion 31 are alternately provided at regular intervals in the circumferential direction. It should be noted that the outer circumferential surface of the rotor core 22 at each of the magnetic pole bordering sections Ld with no displacement portion 31 is in the shape of an arc along the reference circle Ca illustrated in FIG. 3.

Figure 12:
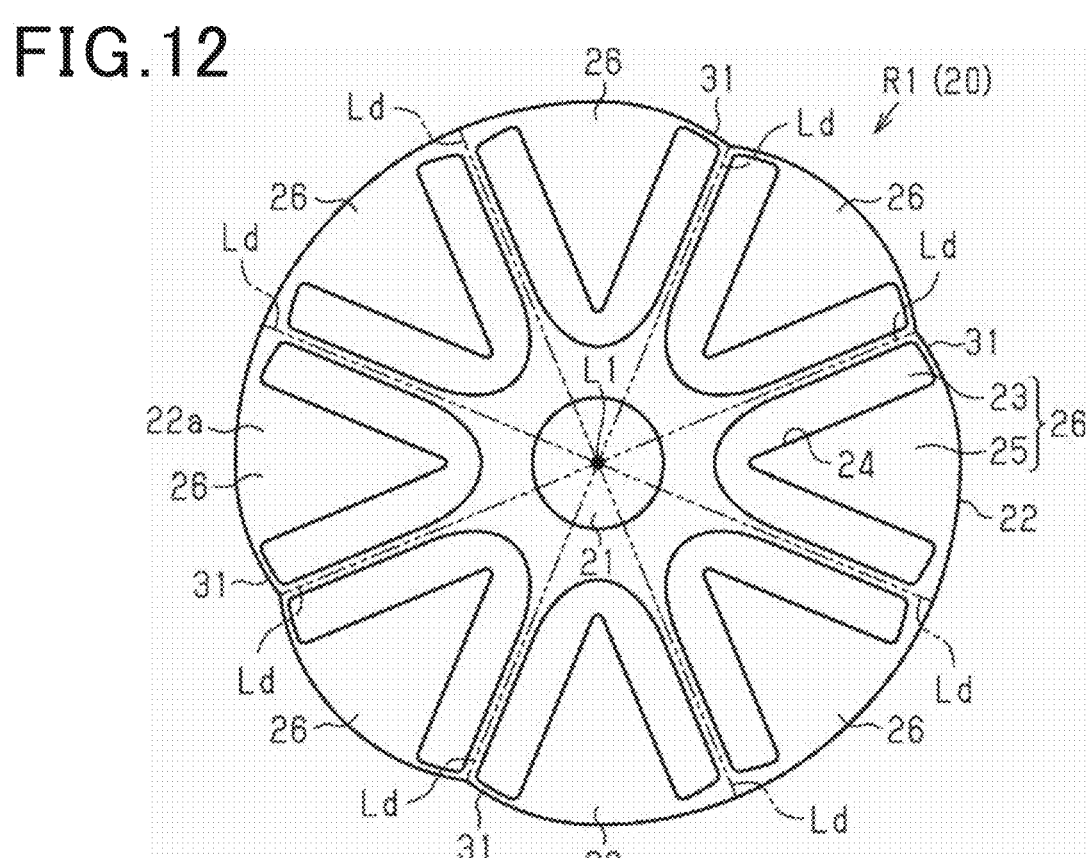
FIG. 12 is a plan view of a first rotor unit of a modification example.

Additionally, for example, in a configuration illustrated in FIG. 12, the four displacement portions 31 a provided at point-symmetric positions around the rotation axis line L1. Assuming that the eight magnetic pole bordering sections Ld are referred to as No. 1 to No. 8 in order in the circumferential direction, the magnetic pole bordering sections Ld of No. 1, No. 2, No. 5, and No. 6 are provided with the respective displacement portions 31. It should be noted that the outer circumferential surface of the rotor core 22 at each of the magnetic pole bordering sections Ld with no displacement portion 31 is in the shape of an arc along the reference circle Ca illustrated in FIG. 3.

Figure 13:
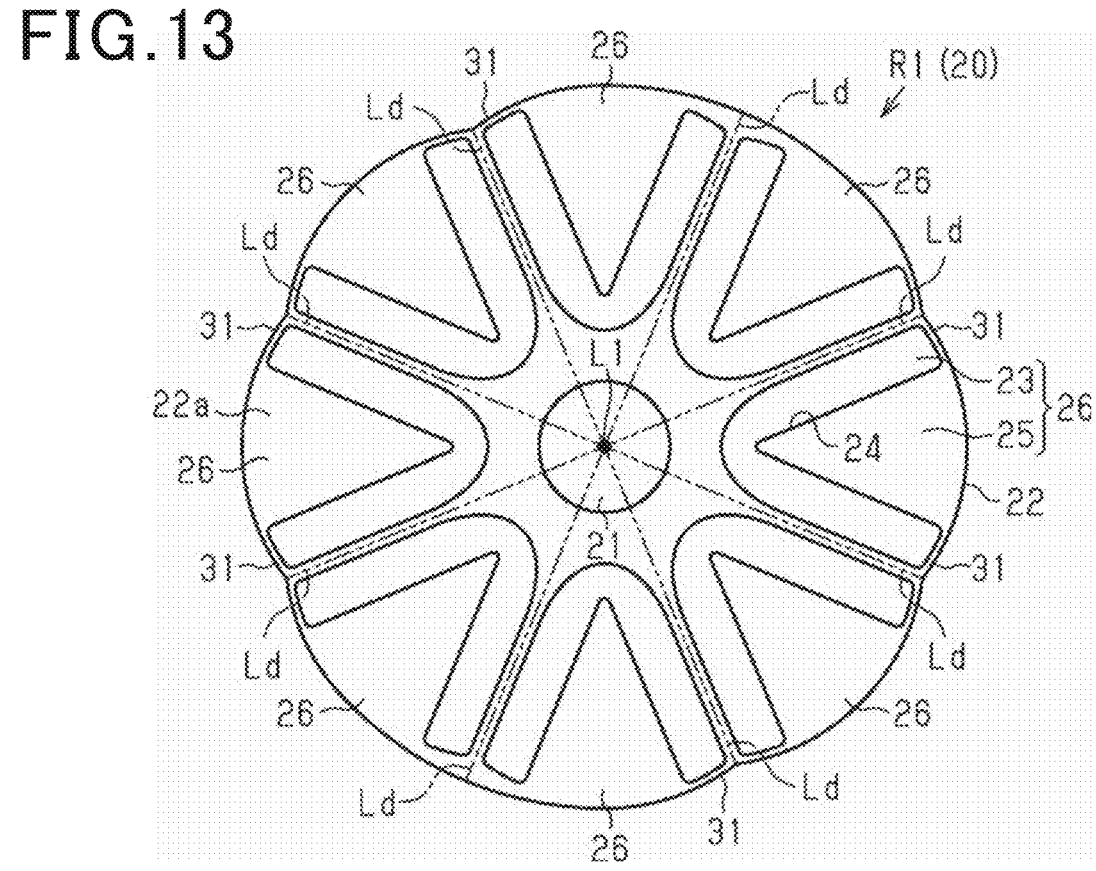
FIG. 13 is a plan view of a first rotor unit of a modification example.

Additionally, for example, six of the eight magnetic pole bordering sections Ld may be provided with the displacement portions 31 as illustrated in FIG. 13. In a configuration illustrated in the drawing, assuming that the eight magnetic pole bordering sections Ld are referred to as No. 1 to No. 8 in order in the circumferential direction, the magnetic pole bordering sections Ld of No. 1, No. 2, No. 3, No. 5, No. 6, and No. 7 are provided with the respective displacement portions 31. That is to say, the two magnetic pole bordering sections Ld with no displacement portion 31 are at 180° opposing positions and the other six magnetic pole bordering sections Ld are provided with the respective displacement portions 31. The six displacement portions 31 are provided at point-symmetric positions around the rotation axis line L1. It should be noted that the outer circumferential surface of the rotor core 22 at each of the magnetic pole bordering sections Ld with no displacement portion 31 is in the shape of an arc along the reference circle Ca illustrated in FIG. 3.

In configurations as illustrated in FIG. 10 to FIG. 13, the plurality of displacement portions 31 are provided at the point-symmetric positions around the rotation axis line L1. This configuration makes it possible to reduce unbalance of a load in the rotor 20 even though the displacement portions 31 are provided and, consequently, reduce vibrations. It should be noted that an even number of the magnetic pole bordering sections Ld are provided with the displacement portions 31 in each of the above-described examples but this is not a limitation; an odd number of the magnetic pole bordering sections Ld may be provided with the displacement portions 31. Additionally, the plurality of displacement portions 31 may be provided at positions that are not point-symmetric around the rotation axis line L1. Additionally, although the first rotor unit R1 is referred to above as an example to describe the alterations of the displacement portions 31, the alterations are likewise applicable to the second rotor unit R2.

In the first rotor unit R1 of the above-described embodiment, the displacement portions 31 are each uniformly formed from the axial one end to the axial other end of the magnetic pole bordering section Ld but this is not a particular limitation. The displacement portions 31 may each be formed only at an axial part of the magnetic pole bordering section Ld.

Figure 14:
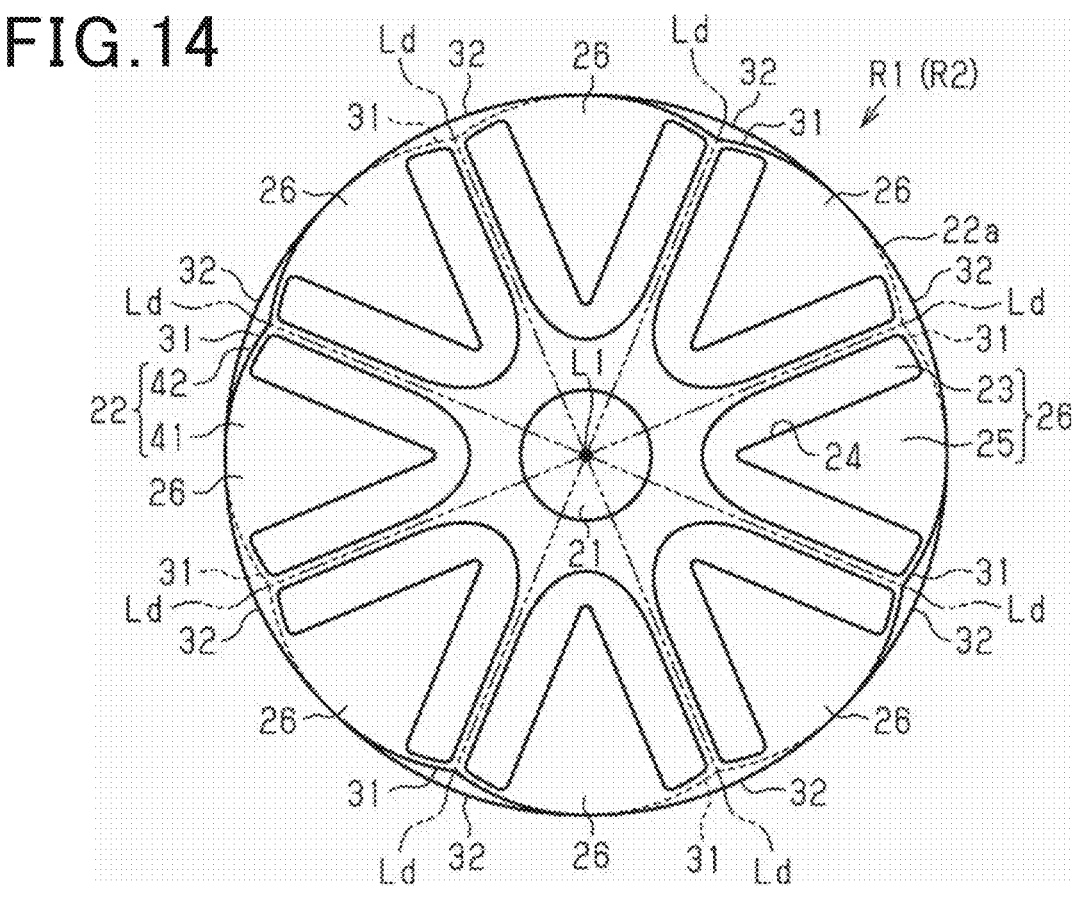
FIG. 14 is a plan view of a rotor of a modification example.
Figure 15:
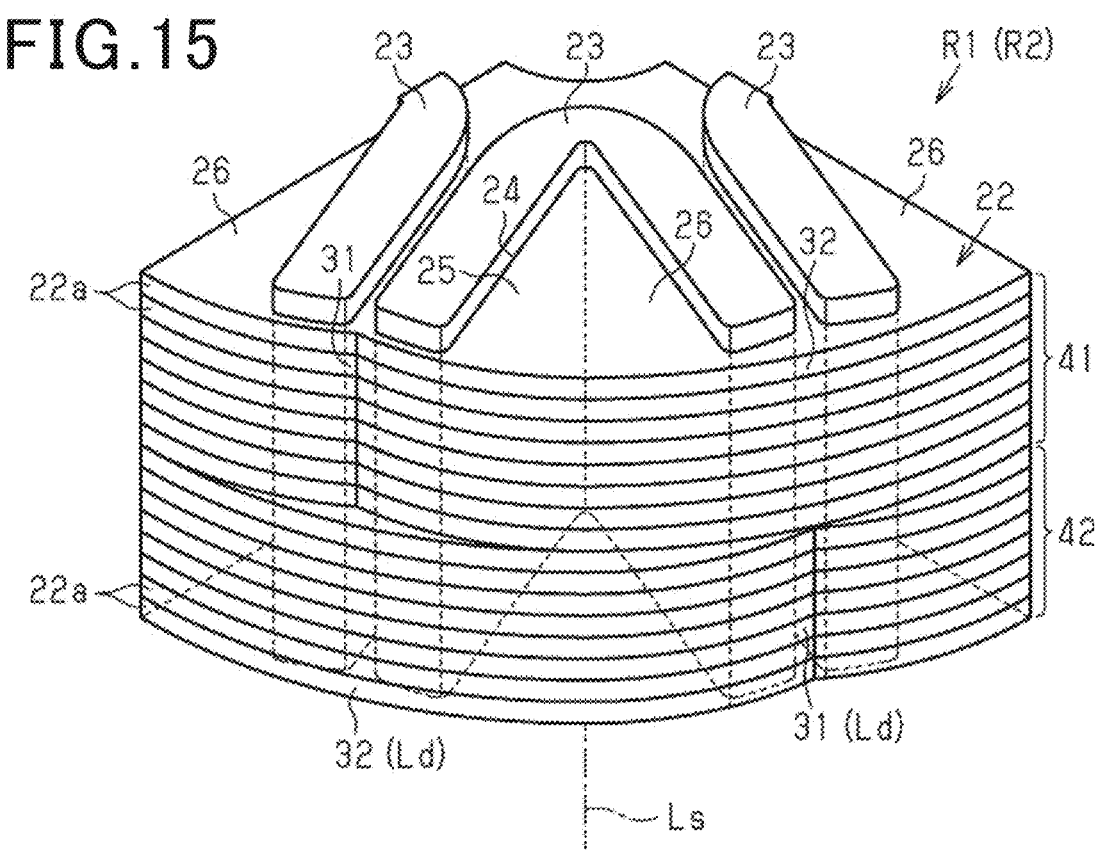
FIG. 15 is a perspective view of the rotor of the modification example.

The configuration of at least one of the first rotor unit R1 and the second rotor unit R2 may be changed to a configuration as illustrated in FIG. 14 and FIG. 15.

In a configuration illustrated in FIG. 14 and FIG. 15, the rotor core 22 includes a plurality of core sheets 22a made of electromagnetic steel sheets stacked in the axial direction. The plurality of core sheets 22a have, for example, the same configuration. That is to say, the respective shapes of the core sheets 22a as viewed in the axial direction are the same as one another. This makes it possible to manage the core sheets 22a as the same parts.

The core sheets 22a each include, for example, a plurality of displacement portions 31. It should be noted that in the configuration illustrated in FIG. 14 and FIG. 15, the core sheets 22a each have, for example, the structure illustrated in FIG. 11, that is, the configuration where the four displacement portions 31 are provided on the respective magnetic pole bordering sections L at positions at 90° intervals in the circumferential direction. That is to say, the core sheets 22a each include the displacement portions 31 and non-displacement portions 32 that are the magnetic pole bordering sections Ld with no displacement portion 31. The displacement portions 31 and the non-displacement portions 32 are present in a mixed manner in the single core sheet 22a. The displacement portions 31 and the non-displacement portions 32 are, for example, alternately provided at regular intervals in the circumferential direction.

The rotor core 22 is configured such that a first region 41 and a second region 42 are disposed side by side in the axial direction. In the first region 41, the core sheets 22 are stacked such that the positions of the respective displacement portions 31 of the core sheets 22*a* are in alignment with one another. The positions of the non-displacement portions 32 of all the core sheets 22*a* of the first region 41 a also in alignment with one another. In the second region 42, the core sheets 22 are also stacked such that the positions of the respective displacement portions 31 of the core sheets 22*a* are in alignment with one another. The positions of the non-displacement portions 32 of all the core sheets 22*a* of the second region 42 are also in alignment with one another.

Moreover, the second region 42 is disposed at a position relative to the first region 41 determined by rotating the magnetic pole bordering sections Ld in the circumferential direction by one amount, that is, an amount corresponding to one magnetic pole, or 45°. This causes the displacement portions 31 of the first region 41 not to be in alignment with the displacement portions 31 of the second region 42 in the axial direction. That is to say, the displacement portion 31 and the non-displacement portion 32 overlap in the axial direction on each of the magnetic pole bordering sections Ld of the rotor core 22. In other words, the displacement portion 31 is provided only at a part of each of the magnetic pole bordering sections Ld in the axial direction. It should be noted that the respective positions of the magnetic pole sections 26 and the magnetic pole bordering sections Ld in the circumferential direction are the same in the first region 41 and the second region 42.

Such a configuration makes it possible to reduce a magnetic unbalance in the circumferential direction and, consequently, reduce the generation of vibrations during the rotation of the rotor 20. It should be noted that the configuration where the displacement portions 31 and the non-displacement portions 32 overlap in the axial direction is not limited to the configuration illustrated in FIG. 14 and FIG. 15. For example, the rotor core 22 may have a configuration where each one of or each two or more of the core sheets 22*a* may be rotated in increments of 45° and stacked.

Additionally, the above description with use of FIG. 14 and FIG. 15 is made on the example where the core sheets 22*a* illustrated in FIG. 11 are used but this is not a particular limitation. For example, the displacement portions 31 and the non-displacement portions 32 may overlap in the axial direction even in configurations where the core sheets 22*a* as illustrated in FIG. 10, FIG. 12, and FIG. 13 are used. Additionally, in a configuration where, for example, the core sheets 22*a* having an odd number of displacement portions 31 are used, the displacement portions 31 and the non-displacement portions 32 may overlap in the axial direction.

In the above-described embodiment, the skew angle θ is set such that Expression (a) is satisfied but this is not a limitation. The skew angle θ may be set at an angle out of the range according to Expression (a).

In the above-described embodiment, the thickness W1 of the linear portions 23*a* is larger than the thickness W2 of the bent portion 23*b* but this is not a limitation. The thickness W1 of the linear portions 23*a* may be equal to the thickness W2 of the bent portion 23*b*. Additionally, the thickness W1 of the linear portions 23*a* may be thinner than the thickness W2 of the bent portion 23*b*.

The configuration of the protruding portion 23*x* of each of the permanent magnets 23 protruding from the end surface 22*c* of the rotor core 22 may be changed, if necessary. For example, part of the V-shaped path including the linear portions 23*a* and the bent portion 23*b* of the permanent magnet 23 may be provided with the protruding portion 23*x*. Additionally, for example, a protruding portion may be partially provided in a thickness direction perpendicular to a direction for the V-shaped path of the permanent magnet 23 to extend. Additionally, for example, the protruding amount D1 of the protruding portion 23*x* is not necessarily uniform in the direction for the V-shaped path of the permanent magnet 23 to extend. Additionally, for example, the protruding portion 23*x* of the permanent magnet 23 may be independent of the embedded magnet portion 23*m*. In this case, the magnet materials of the protruding portion 23*x* and the embedded magnet portion 23*m* may be different. Additionally, for example, all the permanent magnets 23 disposed in the circumferential direction of the rotor 20 are not necessarily provided with the protruding portions 23*x*. Additionally, for example, the protruding portions 23*x* may be provided only in one of the first rotor unit R1 and the second rotor unit R2.

In the above-described embodiment, the first rotor unit R1 and the second rotor unit R2 are configured such that the end surfaces 22*d* of the rotor cores 22 are in contact with each other but this is not a limitation. The end surfaces 22*d* may be separate from each other. In this case, it is also possible to provide the protruding portions 23*x* on sides with the end surfaces 22*d* of the rotor cores 22.

The configuration such as the shape of the permanent magnets 23 is not limited to that of the above-described embodiment and may be changed in accordance with the configuration of the rotating electric machine M, if necessary. For example, the shape of the permanent magnets 23 as viewed in the axial direction may be any other folded shape projecting inward in the radial direction of the rotor 20, such as a U-shape. Additionally, for example, the shape of the permanent magnets 23 as viewed in the axial direction may be a cured shape projecting outward in the radial direction of the rotor 20. Additionally, for example, the permanent magnets 23 may be substantially in the shape of a rectangular parallelepiped and the permanent magnet 23 may each be disposed such that one side surface of the permanent magnet 23 is perpendicular to a straight line passing through the rotation axis line L1 and the magnetic pole center Ls.

Additionally, the number of the permanent magnets 23 of each of the magnetic pole sections 26 is not limited to one. For example, the bent portion 23*b* may be omitted from each of the permanent magnets 23 of the above-described embodiment to separate the pair of linear portions 23*a* from each other.

The permanent magnets 23 are made by injection-molding with the magnet material in to the magnet accommodation holes 24 of the rotor core 22; however, the permanent magnets 23 may be produced in advance and inserted into the magnet accommodation holes 24 of the rotor core 22 and fixed.

A samarium-iron-nitrogen (SmFeN) magnet is used for the permanent magnets 23 but any other rare-earth magnet, ferrite, or the like may be used. Additionally, a bond magnet is used for the permanent magnets 23 but a sintered magnet or the like may be used.

In the above-described embodiment, the configurations of the first rotor unit R1 and the second rotor unit R2 are the same as each other but this is not a particular limitation. For example, the number of the displacement portions 31 may be different between the first rotor unit R1 and the second rotor unit R2. Additionally, for example, one of the first rotor unit R1 and the second rotor unit R2 may have a configuration with no displacement portion 31, that is, a configuration where the shape of the outer circumferential surface of the rotor core 22 as viewed in the axial direction is a circle along the reference circle Ca.

The rotor 20 of the above-described embodiment includes the two rotors, namely, the first rotor unit R1 and the second rotor unit R2, disposed side by side in the axial direction but this is not a limitation. The rotor 20 may include three or more rotor units. Even in this case, the configurations of the rotor units may be the same as one another and the number of the displacement portions 31 or the like may be different among the rotor units. Additionally, in the case where the rotor 20 includes the three or more rotor units, for example, each of the rotor units may be offset in the circumferential direction in increments of a predetermined angle.

The rotor core 22 is made by stacking the plurality of core sheets 22a in the axial direction but may be made in any other manner such as by sintering a magnetic powder.

The stator core 11 is made by stacking the plurality of electromagnetic steel sheets but may be made in any other manner such as by sintering a magnetic powder.

The number of poles of the rotor 20, that is, the number of the magnetic pole sections 26, and the number of slots of the stator 10 are not limited to those of the above-described embodiment and may each be changed, if necessary.

The north poles and the south poles of the rotor 20 illustrated in FIG. 1 and the U-phase, the V-phase, and the W-phase of the stator 10 illustrated in FIG. 1 are merely by way of example and may be changed, if necessary.

In addition to the above, the configuration of the rotor 20 and the configuration of the rotating electric machine M may be changed, if necessary.

The embodiment and modification examples disclosed this time are by way of example in all points and the present disclosure is not limited to these examples. That is to say, the scope of the present invention is defined by the scope of claims, and is intended to include all modifications within the meaning and scope equivalent to the scope of claims.

It should be understood that the wording "at least one of A and B" herein means "A only, B only, or both of A and B."

Although the present disclosure has been described in reference to the embodiments, it should be understood that the present disclosure is not limited to the embodiments and structures. The present disclosure also encompasses various modification examples and modifications within the equivalent scope. In addition, various combinations and forms and even other combinations and forms including only one element, more or less, are within the scope and spirit of the present disclosure.

What is claimed is:

1. A rotating electric machine comprising a stator and a rotor disposed radially inside the stator, wherein the rotor includes a plurality of rotor units disposed side by side in an axial direction, the plurality of rotor units each include (i) a rotor core and (ii) a plurality of permanent magnets that are embedded in the rotor core and are in a folded shape projecting radially inward, the plurality of rotor units each have (i) a plurality of magnetic pole sections that are provided in a circumferential direction and respectively include the plurality of permanent magnets and (ii) a plurality of magnetic pole bordering sections that are boundaries between the plurality of magnetic pole sections, the plurality of rotor units each have a plurality of displacement portions in an outer circumferential surface of the rotor core, the plurality of displacement portions being disposed in one-to-one correspondence with the plurality of magnetic pole bordering sections, each of the plurality of displacement portions is displaced radially inward from respective magnetic pole centers of a circumferentially adjacent pair of the plurality of magnetic pole sections toward a magnetic pole bordering section of the plurality of magnetic pole bordering sections located between the pair of the magnetic pole sections, in rotor units among the plurality of rotor units located at both axial ends of the rotor, the permanent magnets each have a protruding portion protruding from an end surface on a side where no other rotor unit is disposed side by side in the axial direction, magnetic pole centers of one of the plurality of rotor units are offset in the circumferential direction with respect to magnetic pole centers of another of the plurality of rotor units adjacent thereto in the axial direction, and assuming that p denotes a number of poles of the rotor and L denotes a least common multiple of the number of poles of the rotor and a number of slots of the stator, a skew angle θ [°] is set such that $$(180/L)-16/p \le \theta \le (180/L)+36/p$$

is satisfied, the skew angle being a circumferential offset angle between the rotor units.

2. The rotating electric machine according to claim 1, wherein each of the plurality of displacement portions has an arc shape that approaches a rotation axis line of the rotor from the magnetic pole centers toward the magnetic pole bordering section between the pair of the magnetic pole sections as viewed in the axial direction.

3. The rotating electric machine according to claim 1, wherein the respective magnetic pole sections of the plurality of rotor units are same in number, and the magnetic pole sections of each of the plurality of rotor units are provided at regular intervals in the circumferential direction.

4. The rotating electric machine according to claim 1, wherein the plurality of displacement portions are disposed at point-symmetric positions around a rotation axis line of the rotor.

5. The rotating electric machine according to claim 1, wherein the rotor core includes a plurality of core sheets with configurations that are same as each other, and the plurality of core sheets are stacked in the axial direction.

6. The rotating electric machine according to claim 5, wherein for each rotor unit of the plurality of rotor units, the displacement portions of the plurality of core sheets are at a same position in the circumferential direction.

7. The rotating electric machine according to claim 5, wherein, for each of the rotor units:

the core sheets each have the plurality of displacement portions and at least one non-displacement portion at least one of the magnetic pole bordering sections not provided with a said displacement portion;

the displacement portions and the at least one non-displacement portion are present in a mixed manner in each of the core sheets; and the displacement portions and the at least one non-displacement portion overlap in the axial direction on one of the magnetic pole bordering sections of the rotor core.

8. The rotating electric machine according to claim 1, wherein a number of poles of the rotor is eight and a number of slots of the stator is twelve.

9. The rotating electric machine according to claim 1, wherein a number of poles of the rotor is eight and a number of slots of the stator is twelve, and the skew angle θ [°] is set at 3.0° or more.

10. The rotating electric machine according to claim 1, wherein a number of poles of the rotor is eight and a number of slots of the stator is twelve, and the skew angle θ [°] is set such that $5.5° \leq 0 \leq 12.0°$ is satisfied.

11. The rotating electric machine according to claim 1, wherein the outer circumferential surface of the rotor core extends most radially inward at the boundaries between the plurality of magnetic pole sections.

\* \* \* \* \*